United States Patent [19]

Kull

[11] 4,405,059

[45] Sep. 20, 1983

[54] SELECTABLE COUPLING MECHANISM INCLUDING ARTICLE DISPENSERS

[76] Inventor: Leo Kull, 58 Westover Ave., W. Caldwell, N.J. 07006

[21] Appl. No.: 281,671

[22] Filed: Jul. 9, 1981

[51] Int. Cl.³ .............................................. B65G 59/08
[52] U.S. Cl. ..................................... 221/129; 221/298
[58] Field of Search ..................... 221/125, 129, 5, 13, 221/292, 293, 298; 194/10, 2, 1 M

[56] References Cited

U.S. PATENT DOCUMENTS

3,348,733 10/1967 Johnson ............................. 221/298
3,602,403 8/1971 Klem ............................. 221/298 X Primary Examiner—Stanley H. Tollberg

[57] ABSTRACT

An electromechanical selection control is transmitting the rotation of an electric motor output shaft to a selectively controlled reciprocating motion for performing a desired action in one or more selected stations. A coupling mechanism in each station is electrically selectable and mechanically connectable to a power drive and resettable by the power drive within a control cycle. Among the numerous applications the reciprocating coupled motion is usable in vending machines for operating dispenser actuators requiring a reciprocating motion. The control circuitry has flexibility to suit different conditions and it is satisfying the vending machine control requirements where a simple series connected selection switch chain is connectable to a coin validating unit which in the most complex form includes a multiprice and changemaker control circuitry and more than one selectable dispenser groups each including a drive motor and more than one selectable dispensers. The compact coupling mechanism can be directly a part of a dispenser actuator or it is connectable to a dispenser actuator by a connecting linkage if the two are not in a close proximity. Novel front end dispensing mechanisms to act from a horizontal or inclined storage platform are provided for various product shapes including cylindrical containers, rectangular packages and bagged products.

36 Claims, 30 Drawing Figures

SELECTABLE COUPLING MECHANISM INCLUDING ARTICLE DISPENSERS

BACKGROUND OF THE INVENTION

Electrically selectable drive mechanisms are in wide use in electrical or electronic control systems for providing a great variety of timing or selection possibilities for applications among which a selectable automatic merchandise dispensing from a storage is the most common and demanding one. The most widely used and practical storing method is the shelf or drawer arrangement which is usable as an open shelf storage in warehouses or stores for different merchandise container shapes or it is also applicable to closed unattended cabinets for coin controlled merchandisers known as vending machines.

For automatic merchandise machines electrical or mechanical dispenser control means are used to restrict and permit the operation of a single dispenser after a required credit is established in a coin validating unit. Numerous systems and methods are in wide use to satisfy these requirements but in most of them rather costly and complex selection and operating mechanisms in electrical control systems requiring a large number of switching devices, relays, lockdown mechanisms and empty signaling means have to be employed to prevent jackpotting, pilfering or faulty operation.

While the electrical control system could vary to suit various applications, a special importance has to be given to the simplicity and compactness of the coupling mechanism which is normally linked to or it is a part of a dispenser mechanism working close to a storage compartment. Therefore the ideal coupling mechanism has to have compactness and flexibility to fit to available spaces without a sacrifice of storing space or without obstructing the frontal look of a drawer stack if the arrangement is used in a presently popular windowfront vending cabinet, for instance.

An arrangement for mechanically or electrically operated vending machines satisfying the above requirements was disclosed in my U.S. Pat. No. 3,991,907 while similar typical samples for control and dispensing methods are illustrated in U.S. Pat. Nos. 3,174,646, 3,325,049, 3,540,562, 3,653,540, 4,176,762 and 4,192,436.

SUMMARY OF THE INVENTION

This invention provides an improved coupling and control system for electrically selectable motor driven mechanisms where a minimum number of switching devices are used and no control relays are required. The novel coupling mechanism employs an electrical actuator and a two-part simple coupling mechanism which can have numerous different shapes and arrangements with the sole purpose to perform a simultaneous coupling action for selecting an actuator and switching action for starting an electric drive motor. The compact relatively small and thin size of this coupling mechanism is providing a useful reciprocating motion which is coupled both ways to a common drive member. It further has flexibility for applying it to numerous entirely different applications in various electrically selectable control mechanisms among which the automatic merchandising is the most widely known one.

The operating and dispensing mechanism in these machines is designed to handle various product shapes and sizes where the coupling mechanism is linked to the dispenser actuator or in some cases it could be even a part of a dispenser actuator. While the front end dispensing from drawers or trays and a window-front cabinet offers the most compact, simplest and easily serviceable arrangement with an available flexibility for choosing a variety of cabinet shapes, the noval coupling method of this invention could be also usable for operating the dispensers from a vertical or other storage columns, for instance. The choice of a particular method for arranging the dispensing units in an enclosure could be referred to as architecture of the machine and it is not a part of this invention.

It is therefore the main object of this invention to provide an improved coupling mechanism having a selectable electrical actuator for controlling the action of a coupler lever which provides a simultaneous coupling and start switch control to an electric motor.

It is a further object to provide a latching action between an electrical actuator and a coupler lever for the control of the latter.

It is another object in a modified version to provide a two-position control to said coupler by means of an electrical actuator and a reset link powered by the drive motor in the system.

It is a further object to provide a compact coupling and drive system mounted to both sides of a flat base plate.

It is yet a further object in a modified version to provide a modular arrangement where the coupling and drive mechanism can be separated.

It is another object to link said coupling mechanism to operate selectively dispensers for rectangular product shapes having a wide or narrow configuration.

It is a further object to apply the same coupling principle to provide a full revolution selectable control for rotating shafts.

It is yet another object to link said coupler lever directly to a dispensing member for providing a one-by-one releasing for gravity fed cylindrical shapes.

It is yet a further object to provide a two-pivot escapement lever action for a one-by-one release of cylindrical shapes.

It is a general object of the invention to provide a comparative simplicity, compactness and flexibility in a vending system and adaptability of same control method to operate a number of different dispensing mechanisms.

Other objects and advantages of the invention will become apparent from the following description and illustrations.

BRIEF DESCRIPTION OF THE DRAWINGS

FIGS. 6-A, 6-B and 6-C are illustrating the basic principle of the electrically controlled coupling mechanism in three consecutive positions;

BASIC CONTROL SYSTEM

Figure 6:
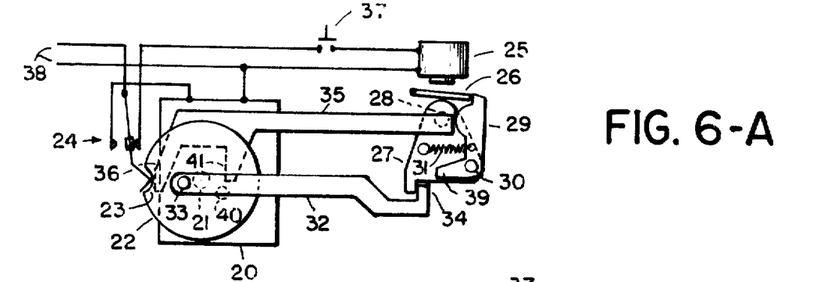

FIG. 6 illustrates schematically three consecutive positions of the basic control arrangement which is shown in its applied form in FIGS. 8, 11, 15, 19 and 25. Same reference numerals for identical elements will be also used later in specific applications The system consists of an electric motor 20 with geared down output shaft 21 rotating a cycle cam 22 which has a notch 23 for a cycle switch 24. The other electric component in the system is an electric actuator which can be a solenoid or an electromagnet 25 with an armature 26. Besides control cam 22 and armature 26 the basic control mechanism employs four members for the purpose of providing a selectably controlled reciprocating motion to an actuator 27 which is pivotally secured to a base (not shown) at 28. A coupling lever or coupler 29 is pivotally secured to the actuator 27 at 30 and spring biased in a counterclockwise direction by a tension spring 31. The actuator 27 and coupler 29 are connected to the motor 20 by means of an actuator link 32 which is reciprocated by a crankpin 33 of cam 22 and which has the right end 34 in contact with actuator 27.

The other connecting link 35 has a horizontal guidance (not shown) and it can be called a start link which is in contact with with coupler 29 and its left end 36 can move the actuator leaf of switch 24.

The control arrangement has a start switch 37 which can connect the power from lines 38 to energize the electromagnet 25 as shown in FIG. 6-B where armature 26 is pulled in and coupler 29 is unlatched. Now spring 31 will shift the start link 35 to the left causing a switchover of cycle switch 24. This action is causing an instantaneous cutoff to electromagnet 25, start of motor 20 and a mechanical coupling of coupler arm 39 to coupling poing 34. Next, the motor cam 22 starts to rotate in a clockwise direction which provides a second hold to the switch 24.

After a 180° rotation the position of FIG. 6-C is reached where the actuator 27 is driven to its extreme right position. During the following return stroke coupling point 34 will be in direct contact with actuator 27 which moves it back to its standby position of FIG. 6-A. Before the end of cycle of cam disk 22 a pin 40 of disk 22 will contact an ear 41 of link 35 and move it to the right which in turn will pivot coupler 29 to its original position of FIG. 6-A where armature 26 can move down and retain this position. After this, the pin 40 will move further and clear ear 41 and in this position notch 23, of cam 22 will permit the switchover of switch 24 which stops the motor 20 and restores the original standby position of FIG. 6-A provided that the start switch 37 is off again. Instead of the latching action for coupler 29, as just described, its two positions can be controlled by a direct motion given by a magnet or solenoid 25 without the spring 31 as will be described later as an alternative control method.

Figures 8, 9, 10:
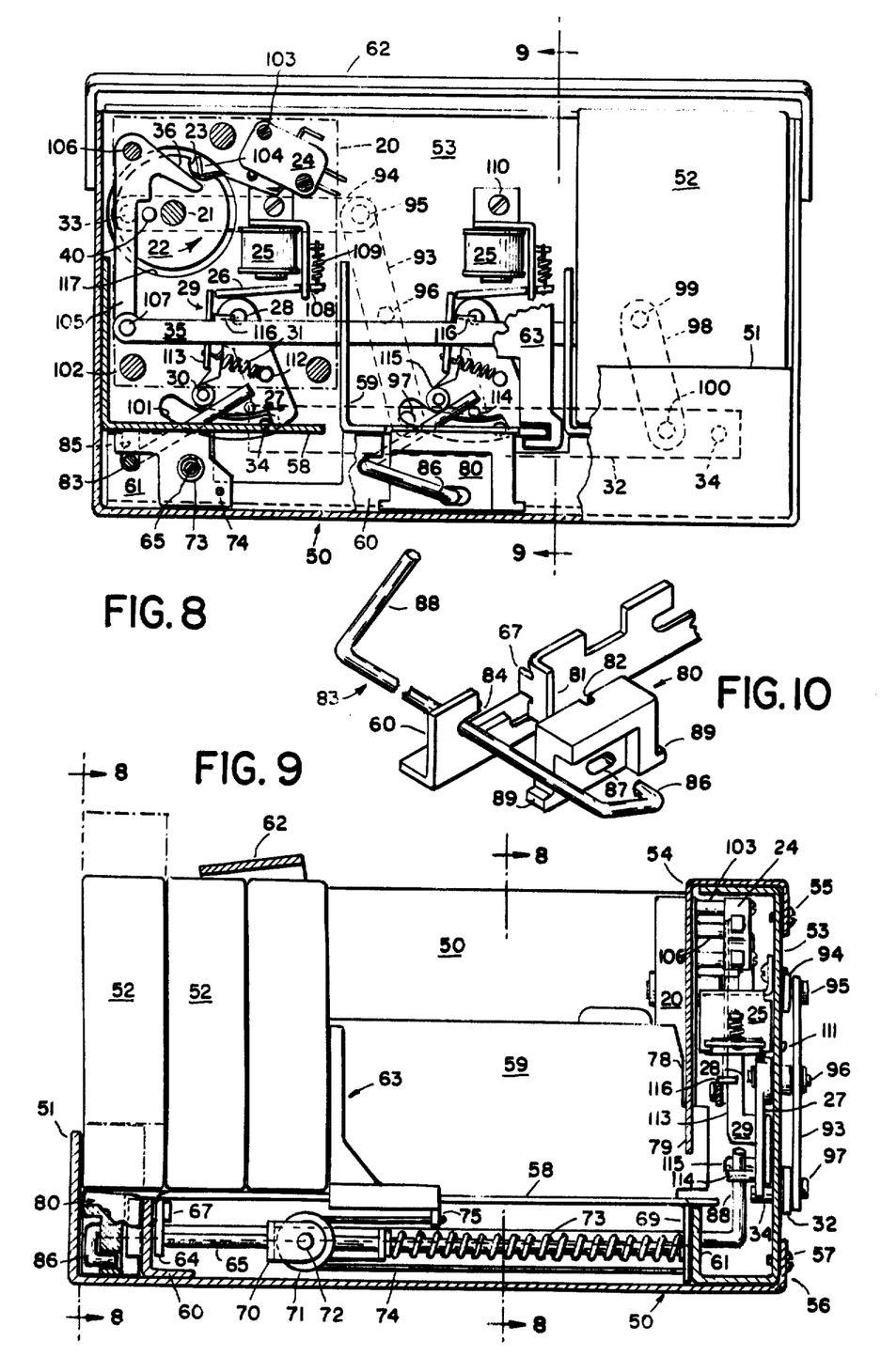
FIG. 8 is a partly fragmentary front view of a dispensing mechanism for rectangular shapes taken along lines 8—8 of FIG. 9.
FIG. 9 is a sectional side view taken along the line 9—9 of FIG. 1.
FIG. 10 is a perspective detail view showing some key components of a dispensing mechanism.
Figure 11:
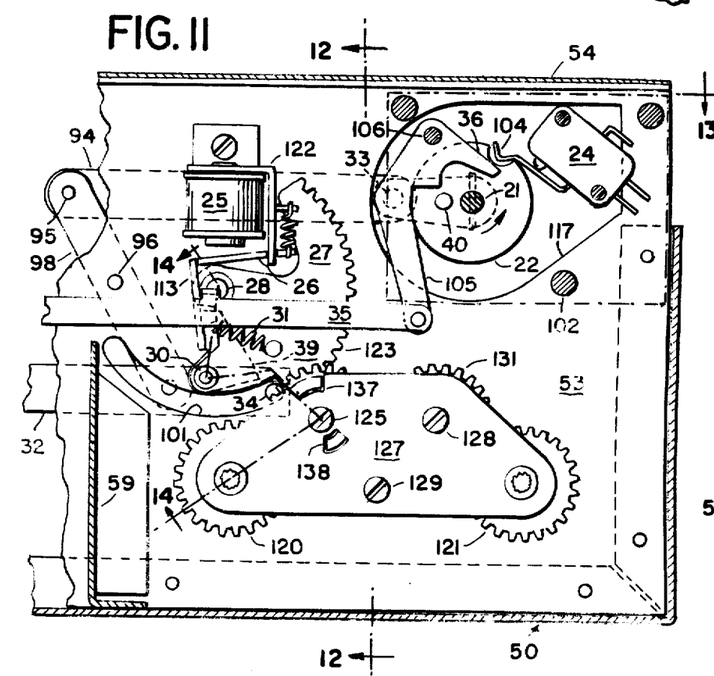
FIG. 11 is a sectional and partial front view of a full revolution selection and drive mechanism taken along the line 11—11 of FIG. 13.
Figure 12:
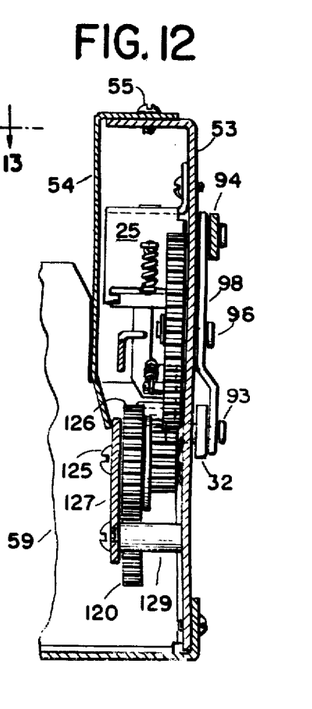
FIG. 12 is a sectional side view taken along the line 12—12 of FIG. 11.
Figure 13:
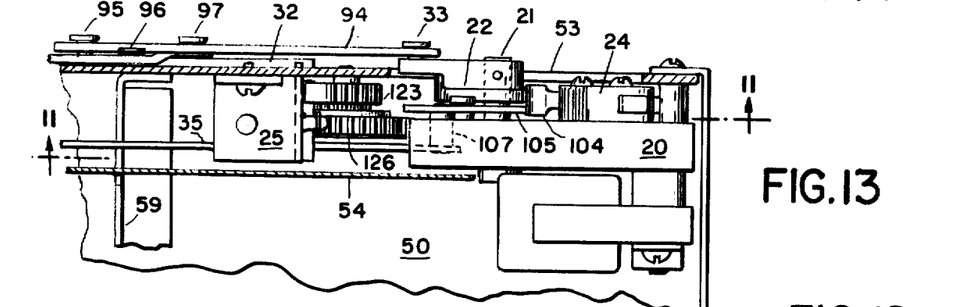
FIG. 13 is a sectional top view taken along the line 13—13 of FIG. 11.
Figure 15:
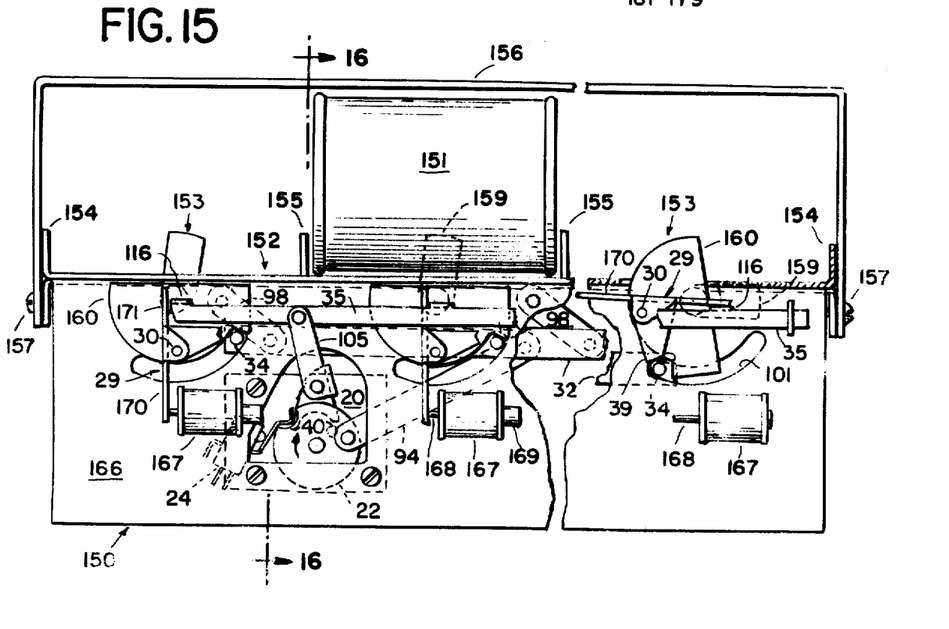
FIG. 15 is a rear view of the dispenser for rolling products as shown also in FIG. 2.
Figure 19:
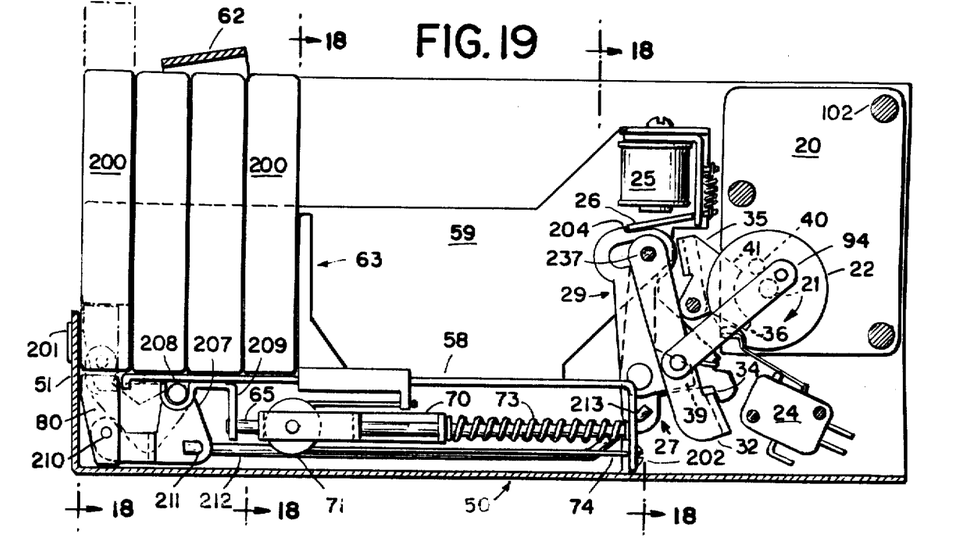
FIG. 19 is a sectional side view taken along the line 19—19 of FIG. 20.
Figure 20:
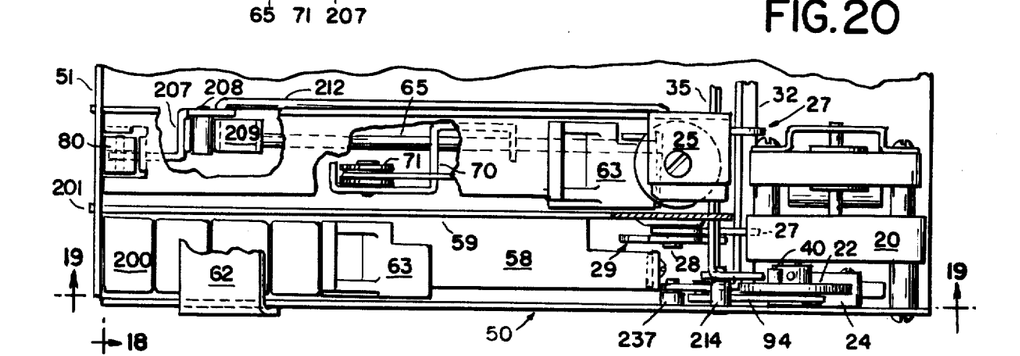
FIG. 20 is a partial top view of FIG. 19.
Figures 25, 26, 27, 28:
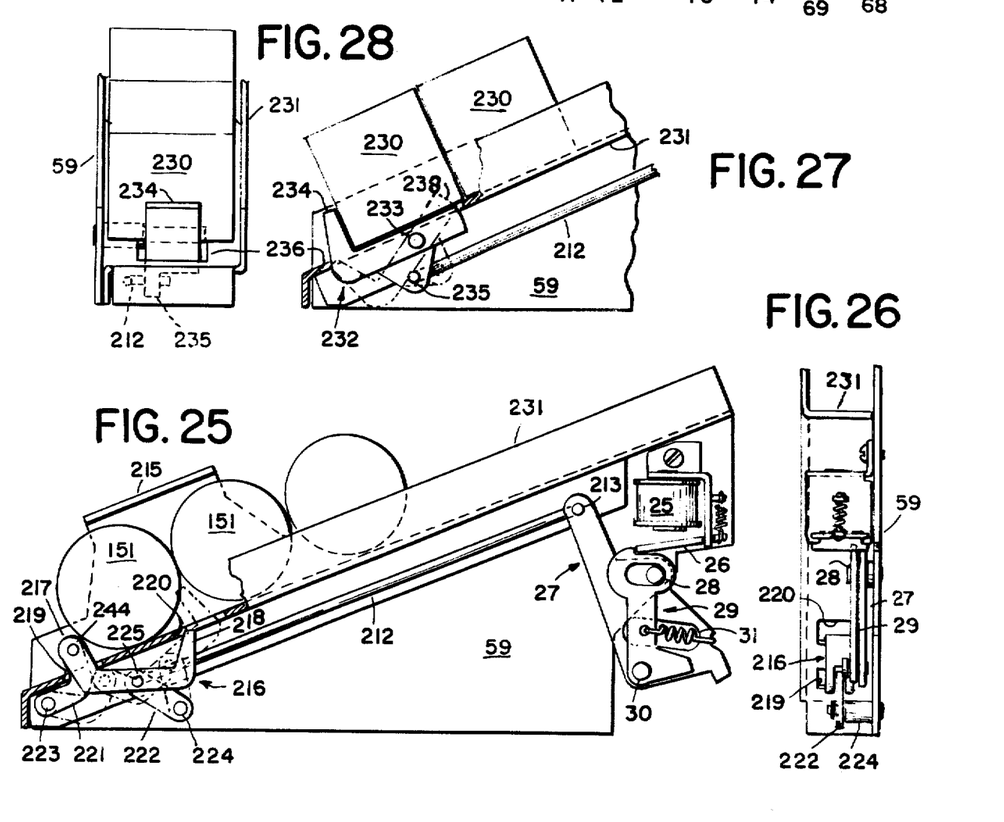
FIGS. 25 and 26 are front and rear views of a dispenser module for narrow rolling products.
FIGS. 27 and 28 are side and front views illustrating a a dispensing mechanism for cubular product shapes.

In practical applications two basic arrangements are possible where the coupling elements consisting of the electromagnets 25, couplers 29 and actuators 27, are placed next to each other as shown in FIGS. 8, 11 and 15 or superimposed as shown in FIGS. 19 and 25. In both cases the parallel moving links 32 and 35 are in contact with all the couplers 29 while link 32 will stay in contact with all the actuators 27. It will be noted here that the link end 34 will keep all the actuators 27 in their home position while during the reciprocation of link 32 only the actuator 27 whose coupler 29 is unlatched by its electromagnet 25 will be coupled to coupling point 34 which provides a positive motion transfer from motor output shaft 21 to actuator 27.

This electrically controlled coupler mechanism can be useful for numerous applications where the control circuitry can vary to suit the requirement of a particular control system. The difference relates mostly to the start switch 37 which is initiating a simultaneous coupling action and motor start. For instance, switches 37 could be controlled by programmed pulses triggering the mechanical coupling actions and selected reciprocations of actuators 27 in any desired sequence or combination one or more at a time.

One of the most demanding applications for the coupler mechanism is the control and selection in vending machines where one of the actuators 27 from a group or from many groups will be selected while a possibility of pilferage or jackpotting has to be prevented.

Figure 7:
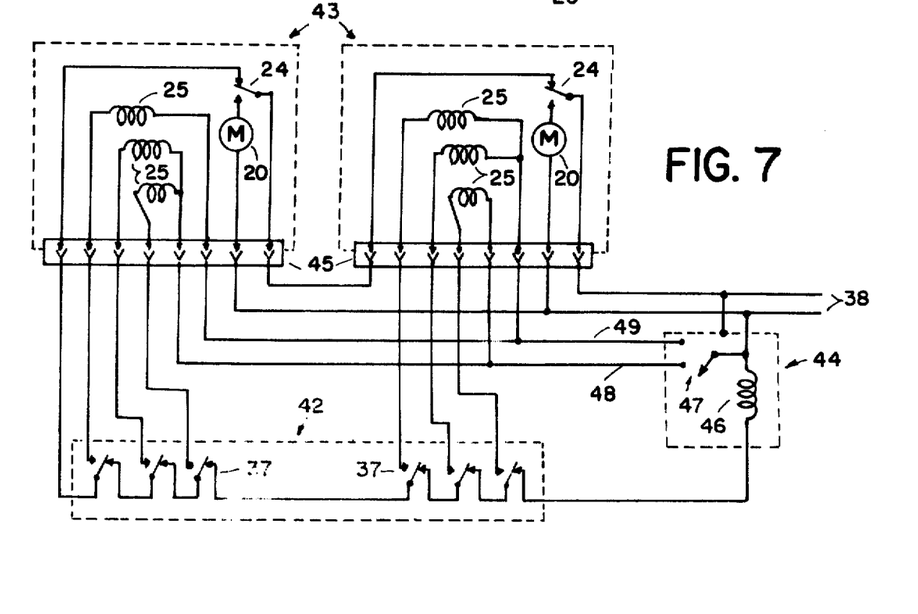
FIG. 7 is a schematic of the electrical control circuitry.

FIG. 7 illustrates the basic circuitry for vending machines. It contains a selection unit 42 where all the selection switches 37 have a series connection, two identical operating units 43 and a coin control unit 44 known in industry as a coin mechanism. The system can contain any number of operating units 43 which could be plugged to the control circuitry using connectors 45 which provide a convenient and fast interchangeability and serviceability. Units 43 contain the electrical components of FIG. 6: motor 20 with the cycle switch 24 and any number of electrical actuators 25. The coin mechanism 44 is connected to power lines 38 which are supplying power to its components suited to satisfy various requirements. The essential elements in a coin unit are one or more coin return electromagnets (CREM) 46 which can be energized through all the selector switches 37 and motor switches 24. This connection in some other control systems could bypass the switchchain 37 which means that the magnet 46 will be connected directly to the line between connector 45 and switch unit 42.

The second essential element in the system is the credit switch 47 which in one form can be a normally off stepping switch with a capability of advancing it to make a connection with one of the price line 48 or 49 when a required credit total is established in the coin unit 44. In a more advanced form this basic control in a coin unit can include a changemaker with an electronic control for credit switching and changemaking. One of the U.S. suppliers for that kind of coin unit is National Rejectors Industries, in Hot Springs, Arkansas.

As seen in FIG. 7, all the electric actuators 25 are connected to price lines 48 and 49 in any possible combination and it is to be understood that theoretically unlimited number of electrical actuators 25 and selections could be provided connectable to any desired number of price lines. Various known methods of providing a price line connection could be applied here such as crossbar switching, multiposition slide switching in each unit 43, rotary switches or multiconnection terminals.

If now the switch 47 is stepped to make a connection to price line 49, the closure of selection switch 37 on extreme left can trigger its corresponding electric actuator 24 while the next two selection switches 37 are ineffective because their corresponding actuators 25 are connected to the open line 48.

A signal light (not shown) could be connected parallel to magnet 46 indicating that the machine is in an operating condition and soldout switches could be added in series with actuators 25 to prevent their operation but in all dispenser arrangements as will be described later, there can be a visual soldout indication eliminating the need for them.

The actuation of the left switch 37 as just described, or any other selection switch 37, will cause an instantaneous switchover of switch 24 which deenergizes the magnet 46 and starts the motor 20 in same unit 43 where the actuator 25 was located. The series connection of switch 37 and the instantaneous action of switch 24 guarantees tht only one of the motors 20 can be started and only one of the couplers 29 will trigger a dispensing action for a product release as will be described later. The cycle time for cam disk 22 could be few seconds and during this time all the actions in coin unit 44 will take place including the credit erasure i.e. resetting of switch 47, changemaking and credit acceptance.

DISPENSER FOR RECTANGULAR CONTAINERS

Figures 1, 2, 3, 4, 5:
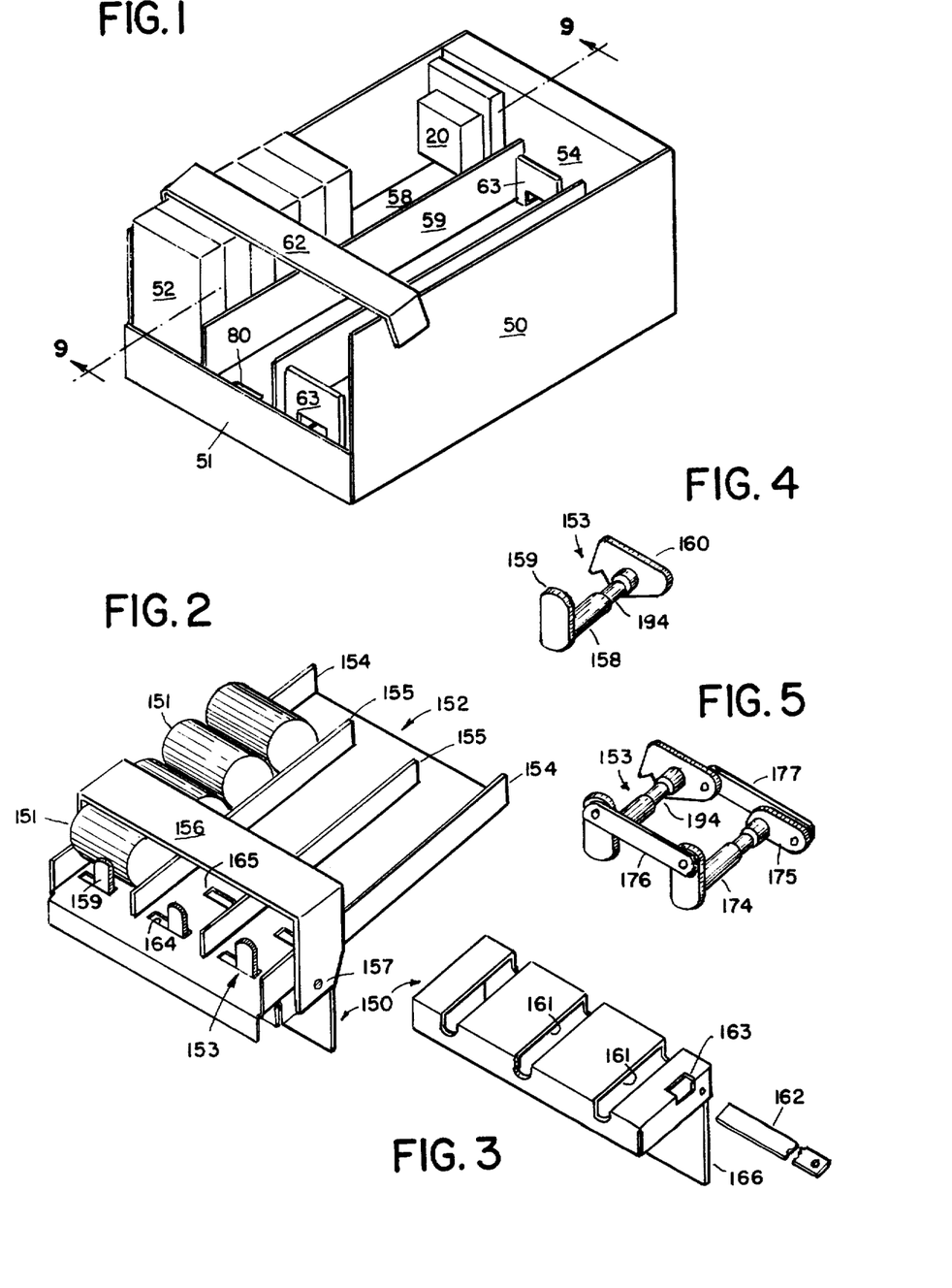
FIG. 1 is a shelf type storage and dispensing unit for rectangular merchandise packages.
FIG. 2 is illustrating an inclined plane storing and dispensing unit for rolling merchandise shapes.
FIG. 3 shows a base member for the dispenser of FIG. 2.
FIG. 4 is illustrating a dispensing actuator.
FIG. 5 is illustrating a double dispensing actuator for longer product shapes.

FIGS. 1, 8 and 9 are illustrating a preferred arrangement to store and dispense rectangular merchandise containers from a horizontal tray. In a most convenient form this tray resembles a drawer-like structure having a U-shape sheetmetal base member 50 with a smaller lip 51 in front to act as a stop or barrier for the packages 52 representing the size of standard cigarette packages for illustrative purposes only. On the rear of the drawer unit is a mechanism plate 53 having a cover 54 secured to it by screws 55. Base 50 has another bentover portion 56 on rear and screws 57 are shown to fasten the plate 53 to it.

Packages 52 are stored in an upright position on platforms 58 which have vertical bentover portions 59 acting as partitions between package columns. Platforms 58 are resting on a L-shaped support 60 welded to base 50 and on another bentover portion 61 which can be a part of plate 53. A restrictor strip 62 could be used to join the sides of base 50 and its angular position provides a lead angle for package entrance from rear and it will resist a possible upward motion of the second package when the first one is lifted for dispensing as will be described later.

Figure 22:
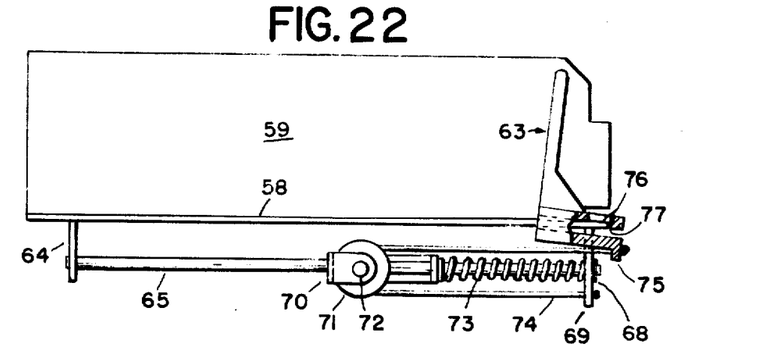
FIGS. 22, 23 and 24 are illustrating a storing platform unit in front, side and top views.
Figure 23:
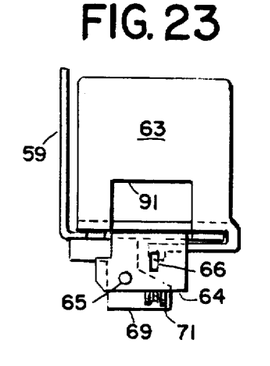
Figure 24:
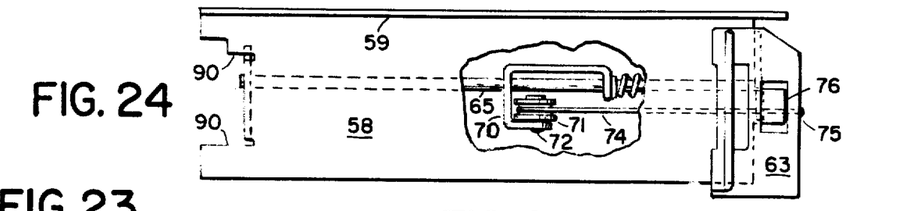

The packages 52 are spring biased against the lip 51 by means of a pusher slide 63 which in a preferred form is molded from a plastic material and which can slide freely on platform 58 as shown best in FIGS. 22, 23 and 24. Platform 58 has in front a bent down portion 64 for supporting a guide rod 65 and for providing a rectangular hole 66 which is received by a tab 67 of the support strip 60. The other end of rod 65 has a shoulder and retaining ring 68 for axially positioning it in a hole of another bentdown portion 69 of platform 58. Rod 65 is slidably supporting a roller bracket 70 which has a roller 71 rotatably secured to it by a stud 72. Rod 65 further guides a compression spring 73 urging the roller 71 toward the front. A cable or band 74 is wrapped around the roller 71 with one end of it secured to an ear 75 of pusher 63 and the other end to the lug 69. In FIGS. 22 and 24 the pusher 63 is shown in its extreme right position where latching or holding means consisting of an ear 76 of platform 58 and a retainer shoulder 77 of pusher 63 are holding it against the pull of cable 74. A slight pull of the upper edge of pusher 63 to the left will release this latched condition allowing the pusher 63 to move against packages as shown in FIG. 9 where the front lip 51 will hold the packages. During loading the pushers 63 will be moved to the rear to store the energy in spring 73 and the holding feature will simplify the loading. If now the drawer unit is designed for a pullout to ease loading, the unlatching of pushers 63 could be done automatically if the rear cabinet wall is provided with posts or tabs extending through plate 53 and reaching the upper edge of the pusher 63 to provide the unlatching motion for them.

The partitions 59 have notches 78 to match slots in cover 54 for retaining and spacing the rear ends of the partitions 59. The spring 73 of pushers 63 can be conveniently matched with the gradually reducing frictional resistance of packages 52 as they are dispensed one-by-one to assure almost the same pushing force to the front package from a full stack to a single package. Spring 73 is compressed half the distance of the motion of pusher 63 permitting a proportioning of the spring size for any desired length of the platform 58 and for any frictional condition between packages 52 and platform 58.

In a basic sense the dispensing method of this invention applies a principle used in springloaded magazines where the dispensing or release of an item requires a motion perpendicular to the feeding springload.

In FIGS. 9 and 10 a pusherblock 80 is shown which is loosely placed between lip 51 and strip 60 and guided by a bentover portion 81 of strip 60 which is received by a vertical guidance groove 82. The required vertical motion to block 80 is given by an operating lever 83 bent from a rod stock and pivotally guided in a slot 84 of strip 60 and on rear in a slot 85 of bentover portion 61. The front end of rod 83 is bent to a U-shape 86 and received by a slot 87 in a recessed section of block 80.

In the assembled form the slots 84 and 85 are closed by mating tabs 64 and 69 and if the rear bentover end 88 of rod 83 is pivoted now in a counterclockwise direction, the block 80 will be lifted by the front end 86 until the shoulders 89 of block 80 are contacting the edges 90 of platform 58. Shoulders 89 help also to maintain the horizontal level of the block 80 when the guide slot 82 starts to lose its effectiveness on the upper position of block 80.

The phantom lines in FIG. 9 show the block 80 and a package 52 in its upper position clearing lip 51. The spring 73 applies its force now to roller 71 which will force the pusher 63 by means of cable 74 to the left and the foremost package 52 can move a short distance determined by the thickness of block 80. During return stroke when the operating arm 88 is moved in a clockwise direction, the block 80 will move down while the lip 51 retains the position of the package 52 and now the pusher 63 will push the next pack 52 against lip 51 which completes the dispensing cycle by letting the foremost package to gravitate to a delivery location.

The retainer strip 62, which could be made adjustable if different package heights are used, provides an extra safety to hold the next-to-dispense package down; but the system could work also without it unless the nature of packages is such that they can stick to each other. The pusher 63 is also provided with a clearance opening 91 to clear the block 80 in case it is operated without a pack on platform 58.

FIG. 8 is illustrating the application of the basic control mechanism of FIG. 6 to provide a selected reciprocating motion for the dispenser blocks 80. The object here is to start the motor 20, rotate its cam disk 22 in a counterclockwise direction and couple a reciprocating motion, generated by the crankpin 33, to actuator 27 which in turn will move block 80 up and down to perform the dispensing action on a selected column. Crankpin 33 is transmitting its rotary motion to a reciprocating motion of a lever 93 by means of a connecting link 94 which is pivotally secured to it at 95. Lever 93 again is pivotally secured to plate 53 at 96 while its lower end is pivotally secured to the actuator bar 32 at 97. Actuator bar 32 is a part of a parallelogram-type four bar linkage where the second layer 98 is pivotally secured to plate 53 at 99 and to the actuator 32 at 100.

Bar 32 has coupling points 34 provided for each coupling mechanism in a form of a pin extending through a clearance slot 101 in plate 53 and reaching the actuator 27 and coupler 29. The pivot studs 28 of actuators 27 are in line with pivot studs 96 and 99 and coupling pins 34 are also in line with pivot studs 97 and 100. The distance between studs 28 and 96 and also between stud 97 and pin 34 are selected to be same and consequently any pin 34 on bar 32 will trace an arc where its center will be the corresponding stud 28.

The elements of FIG. 6 have exactly same function in FIG. 8 but in this applied form the motor 20 is mounted to plate 53 by means of three studs 102 which can be integral parts of the motor gearbox casting. The motor 20, which has a rather low torque requirement, is fitted between partitions 59 which makes it possible to have a neat compact drawer shape where nothing is extending out and only one merchandise column with the motor will have a slightly reduced storage capacity.

Switch 24 is a standard enclosed type mounted on studs 103 and having a wide actuator 104 operable by camdisk 22 or by a lever 105 which is pivotally secured at 106 to a stud of the motor gearbox. Start bar 35 is pivotally secured at 107 to lever 105 while its right end will have horizontal guiding means (not shown).

The electrical actuator 25 is shown to be an electromagnet of the type widely used in relays having a conventional pivot 108 and a return spring 109. It is mounted to plate 53 by means of a screw 110 and a tab 111 next to pivot point 108 could extend into a hole in plate 53 to insure a precise positioning for it.

Actuator 27 could be molded from a plastic material providing a pivothole for stud 28, another pivot hole for a pivot stud 30 which is secured to the coupler 29, an an anchoring stud 112 for spring 31 whose other end is secured to a bentover portion 113 of coupler 29. The motion of the actuator 27 is transmitted to the arm 88 by a stud 114 and a boss 115 which are capturing it from both sides. Start link 35 has bentover tabs 116 in contact with all the arms 113 of couplers 29 and the armature 26 of magnets 25 will hold all the couplers 29 in a standby position where the coupler arms 39 are not in contact with pins 34.

If now an electromagnet 25 is energized by a selection switch 37 or by any other means, its armature 26 is pulled in and the cycle will be started and controlled as described in FIG. 6 with the exception that any of the electromagnets 25 can release the stored energy of the spring 31 to let its coupler 29 move to a coupled position with its pin 34 and in same time actuate switch 24 by means of lever 105. Now the crankpin 33 which works through a clearance hole 117 in plate 53, transmits its rotary motion to a swinging motion of pins 34 and the coupler 29 which was unlatched will pivot the actuator 27 in a clockwise direction while pin 114 will pivot the arms 88 and 86 in a counterclockwise direction lifting the block 80 thereby.

During the return stroke of pin 34 actuator 27 will be contacted directly and block 80 will be lowered. Before the end of cycle reset pin 40 will contact lever 105 and move start link 35 to the left together with arm 113 of coupler 29 until armature 26 clears it and moves down to retain the coupler 29 in its standby position. This resetting action will start while actuator 27 is still in motion and thus arm 113 is receiving a compound motion which lets the resetting to take place before the end of cycle. Now the notch 23 and arm 36 both permit the switchover of switch 24 and termination of the cycle while the reset pin 40 has travelled to a position permitting the operation of lever 105 to start the next cycle as this can be initiated by any electromagnet 25 again.

The drawer of FIG. 1 thus is a self contained unit including the motor 20 and any number of merchandise storage columns. The electrical system of FIG. 7 again permits the linkup of any number of drawer units all operable by a single coin unit 44. These compact drawer units where the operating mechanism is placed underneath a storage platform and the selectable drive mechanism on the rear can offer a very advantageous storage density. For instance, if 4 drawers stacked on top of each other have 10 columns each and each column has a storing capacity of 20 standard size cigarette packages, the result is a 40 selection 800 pack drawer arrangement occupying a volume only 24" wide, 20" high and 20" deep.

HELIX-TYPE DISPENSER TRAY WITH ONE MOTOR

FIGS. 11, 12, 13 and 14 are illustrating a very similar selection arrangement as just described to provide a selectable 1-revolution drive to widely known helix-type dispensers or for any other dispenser method operable by a selectable one-revolution drive. Since most of the operating parts are same or similar again and have same function, they will have same reference numbers and will not be described in full detail anymore.

FIG. 11 illustrates the drive for a double helix where the object is to rotate gears 120 and 121 in an opposite direction one revolution each when a selection signal is given. A similar U-shaped tray or drawer structure could be used here as in FIG. 1 where a mechanism plate 53 with the cover 54 contains all the selection and drive components and the motor 20 is in one corner with a slight reduction in storing capacity for the column in that corner. Plate 53 is used again to mount all the drive components: link 94, lever 98 and bar 32 whose pins 34 work through slots 101 for the purpose of coupling the actuator 27 to it when the armature 26 of electromagnet 25 is pulled in and coupler 29 is allowed to make the coupling action while the arm 113 is moving the start bar 35 to the right which in turn will pivot lever 105 and actuate the switch 24 for cycle start.

Actuator 27 in FIG. 11 is a sectorgear rotatably secured to a stud 28 and normally held against the body 122 of magnet 25 by pin 34. The gearteeth 123 of actuator 27 are in mesh with a pinion 124 rotatably mounted to a post 125 (FIG. 14) and their ratio is selected to be 1:4 which means that actuator 27 can rotate pinion 124 a full revolution.

Figure 14:
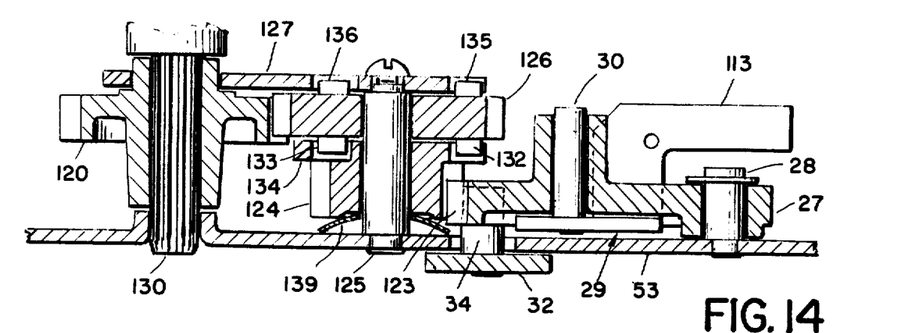
FIG. 14 is an enlarged developed crosssection of drive components taken along the line 14—14 of FIG. 11.

Post 125 also provides a rotatable mount to a gear 126 and provides a support to a bridgeplate 127 which is further supported by posts 128 and 129. Gear 126 is meshing with the gear 120 which has same number of teeth and which is supported by plate 127 and by plate 53 when a splined shaft 130 is inserted in a splined hole in gear 120. Shaft 130 thus will be rotated one revolution when sectorgear 123 is rotated 90° and it could be molded from a plastc material to a shape suitable for fastening one end of a spiral feedcoil wellknown in industry or to any other shape to provide a dispenser or any other useful actuation generated by a controlled one-revolution shaft.

FIG. 11 shows an arrangement for a double helix drive where gear 121, having same size as gear 120, is driven by an idler 131 rotatably mounted to the post 128 and in mesh with gear 126. Thus gears 120 and 121 will rotate one revolution each in the opposite direction whenever sectorgear 123 rotates 90°.

A one direction drive is provided between pinion 124 and gear 126 which in a basic sense works as a one tooth lateral ratchet drive. Gear 126 has ratchet teeth 132 and 133 on different radial distance matched by recessed mating ratchet teeth in a flanged portion 134 of pinion 124. On the opposite side of gear 126 are similar backup teeth 135 and 136 coacting with a notch 137 and hole 138 respectively. A bowed spring washer 139 is keeping pinion 124 in contact with gear 126 and the latter against plate 127. The teeth pairs 132, 133 and 135, 136 on different radial distance makes them act independently as a full revolution ratcheting but provides a double drive strength and also provides a better lateral balance against the spring 139.

While the coupled sectorgear 123 is reciprocating, the pinion 124 is completing a full revolution first in one direction and then in the opposite direction. The rotation of gear 126, however, will be in one direction only which is determined by the sloping of drive teeth 132 and 133 and backup teeth 135 and 136. This means that the first reciprocation half of sectorgear 123 could be used to drive gear 126 or if the sloping of ratchet teeth is in the opposite direction, the second reciprocating half of sectorgear 123 will act as the drive to gear 126 providing the rotation in the opposite direction.

Since a slight overtravel is required in ratchet drives to guarantee a safe drive and backup pawl action, the sectorgear 123 Ts to rotate few degrees more than 90° and since a clearance is also required between the drive pin 34 and coupler arm 39, an extra motion is added which means that the pin 34 has to travel about 100° which can be easily controlled by the harmonic drive linkage on the rear side of plate 53.

DISPENSER FOR ROLLING PRODUCTS

Figures 16, 17:
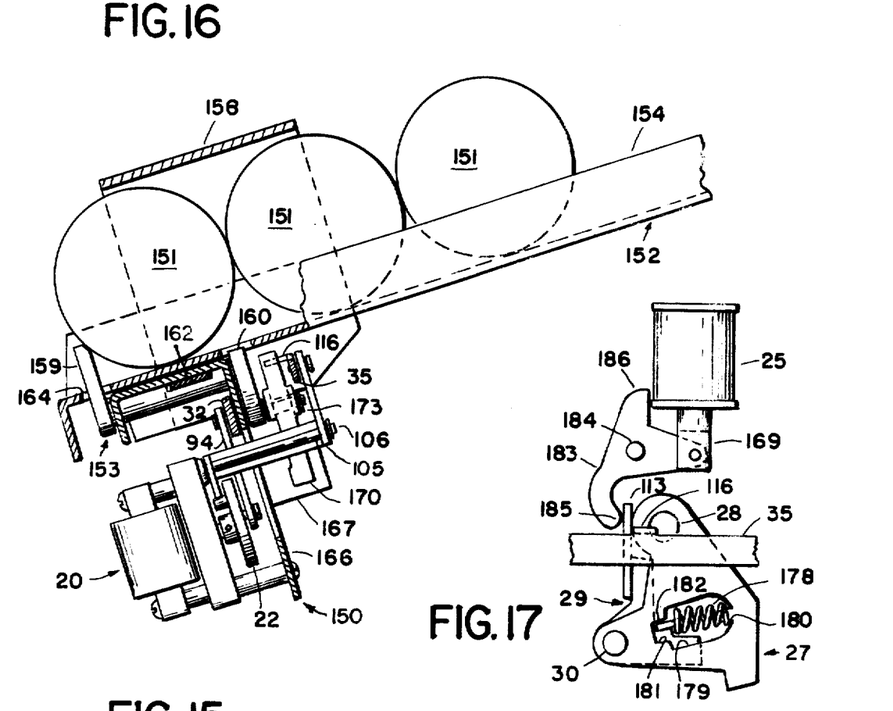
FIG. 16 is a sectional side view taken along the line 16—16 of FIG. 15.
FIG. 17 is a modified control detail as a substitute for latching mechanisms.

FIGS. 2, 15 and 16 are illustrating a new dispenser method for cylindrically shaped products like containers for canned food, bottles etc. A widely used storing method here is an inclined platform where a row of gravity fed items have a restricting or dispensing mechanism on its lowermost end which lets them pass one-by-one when the dispensing mechanism is operated.

The complete dispensing and operating mechanism is mounted to a U-shape sheetmetal channel 150 which is best shown in FIG. 3 while FIG. 2 is illustrating a three selection unit where the rolling products 151 are stored on an inclined plane or platform 152 and held in its front lowermost end by a pivoting dispensing member 153. Platform 152 has flanges 154 and separators 155 to give proper guidance to products 151. A U-shape barrier strip 156 is provided to retain the first two products 151. It is welded to the flanges 154 and it can be used also to join the platform assembly and channel 150 by means of screws 157 on either side.

The dispensing member 153 could be molded from a plastic material as shown in FIG. 4. It has a round centerportion 158, a front upright restrainer 159 which is holding the cans in a display position close to the front end of platform 152. On the opposite or rear end of dispensing member 153 there is another restrainer 160 which is in a horizontal position or in a right angle relationship to front restrainer 159. Channel 150 has slots 161 which form a seat and a pivoting support for dispensing members 153 when they are assembled as shown best in FIG. 16. A retainer strip 162 could be inserted through a slot 163 to retain all the dispensing members 153 which have mating grooves 194 suited to strip 162 and permitting a 90° rotation to dispensing members 153. Platform 152 is provided with clearance slots 164 and 165 to clear the front and rear restrainers 159 and 160, permitting their rotation thereby.

The arrangement so far described demonstrates that a 90° reciprocation of dispenser member 153 will provide a positive one-by-one dispensing of cans 151 resembling in a basic sense an escapement principle where the gravity fed cans 151 are comparable to an escapement wheel having an infinitely long radius and its axis being at right angles to the axis of the pivoting catch which is represented by the dispensing member 153. In vending machines a low torque 90° dispensing motion could be provided by a manual vertical or horizontal pull motion using the control mechanism of my U.S. Pat. No.

3,713,562 or by an electrical control of FIG. 15 which is illustrating the application of same control principles as previously described but in a slightly modified way.

The complete electrical drive and selection mechanism for providing the pivoting motion to dispensing members 153 is mounted to the rear leg or plate 166 of channel 150. It mounts all the familiar components having same reference numerals as described for FIGS. 8 and 11: the motor 20 with its cam 22 and switch 24, connecting link 94 driving the bar 32 together with its pins 34 and switchlever 105 pivotally connected to start bar 35. Parallelogram-type four-bar linkage is provided again by two cranks 98 whose centers 99 are in line with the pivot centers of dispenser members 153 insuring that the pins 34, which extend through slots 101, follow an arc whose center coincides with the pivot center of members 153 when the cam 22 turns one revolution. The rear restrainer 160 of dispensing member 153 in this application is shaped to act directly as the actuator 27 which is in contact with pin 34 as in previous applications. Coupler 29 is again pivotally secured at 30 to restrainer 160 and its coupler arm 39 is normally held in a disengaged or inactive position. In previous applications the two position control of coupler 29 was controlled by a latching action initiated by electromagnet 25 and reset by bar 35. Since the selection and coupling control of this invention simply requires a two position control for coupler 29, in FIG. 15 a pushtype small solenoid 167 is used. A pusher end 168 of its plunger 169 is acting to operate an arm 170 of the coupler 29 whose opposite arm 171 is in contact and operable by a bentdown tab 116 of start bar 35. A bowed spring washer 173 is used to maintain the two positions of the coupler 29. This could be aided or substituted by a detent action or by an overcenter spring action as will be described later.

If now one of the solenoids 167 is energized by its selection switch 37, pusher 168 will give coupler 29 a clockwise rotation causing arm 171 to move bar 35 to the right and switchlever 105 in a clockwise direction which will cause switch 24 to energize the start of the motor 20. It is noted here that the motion of pusher 168 to coupler 29 cannot move pivot center 30 because actuator 160 is held by pin 34 and therefore the coupler 29 will be positively moved to the active position against the retaining friction and the operating force of switch 24.

Next, the motion of cam disk 22 will move the selected dispensing member 153 to its other extreme position by lowering the front restrainer 159 and raising the rear one 160 as shown on the right side of FIG. 15. This action permits the lowermost can 151 to roll down to a delivery location and the next one will be held by the rear restrainer 160. During return stroke the dispensing member 153 will reach its standby position which means that the restrainer 160 will be lowered and front one 159 raised letting the next can to roll against it. This provides a positive dispensing action where the barrier strip 156 prevents any chance for the first and second can to override the restrainers 159 and 160. If the slope angle of platform 152 is small, the system can work reliably without the barrier strip too. The distance between the holding edges of restrainers 159 and 160 can be selected somewhat less than the diameter of cans 151 and because the pivot center of dispensing members 153 is below platform level 152, the operating angle for the dispensing member 153 can be less than 90°.

The mechanism will be reset during the last part of the return stroke when pin 40 is contacting switch lever 105 and giving it a counterclockwise rotation which makes the resettable coupler 29 to move also in a counterclockwise direction for moving it to its inactive position and also pushing the plunger 169 back to its original position. The control system thus has positive motions without the springs except the friction spring washer 173.

For products with a larger length to diameter ratio, like bottles, a two member restrainer could be used as shown in FIG. 5. Here a second dispensing member 174 with a rear restrainer 175 similar to front one is connected to the driving dispensing member 153 by means of two connecting links 176 and 177 which have same centerdistance as used between a pair of slots 161 in channel 150. This is a wellknown double parallelogram motion transmission linkage providing a stable retaining for any long product shape.

In FIG. 17 an overcenter compression spring 178 is illustrated to provide an alternate method for maintaining the two positions of the coupler 29 which is again pivotally secured to actuator 27 at 30. Actuator 27 has an opening 179 with a tab 180 to mount one end of spring 178 and a limit stop clearance notch 181 for a tab 182 of coupler 29 which mounts the other end of spring 178. In a compressed state the spring 178 provides an overcenter action which keeps tab 182 against either side of the limit notch 181. This overcenter retaining method could be used for the coupler 29 in FIG. 15 and also as a direct substitute for FIGS. 8 and 11. In this arrangement the motion of actuator plunger 169 is transmitted to coupler arm 113 by means of a lever 183 which is pivotally secured to a base member at 184 and which has an actuating point 185 in contact with arm 113 and a stop arm 186 is shown to act as a limit stop against the body of actuator 25. Lever arm 113 is thus contacted by arm 185 slightly above the pivot point 28 of actuator 27 while the tab 116 of the reset bar 35 will be slightly below the pivotpoint 28 permitting the swinging clearance to coupler arm 113 thereby.

DISPENSERS FOR NARROW PRODUCTS

Figures 18, 21:
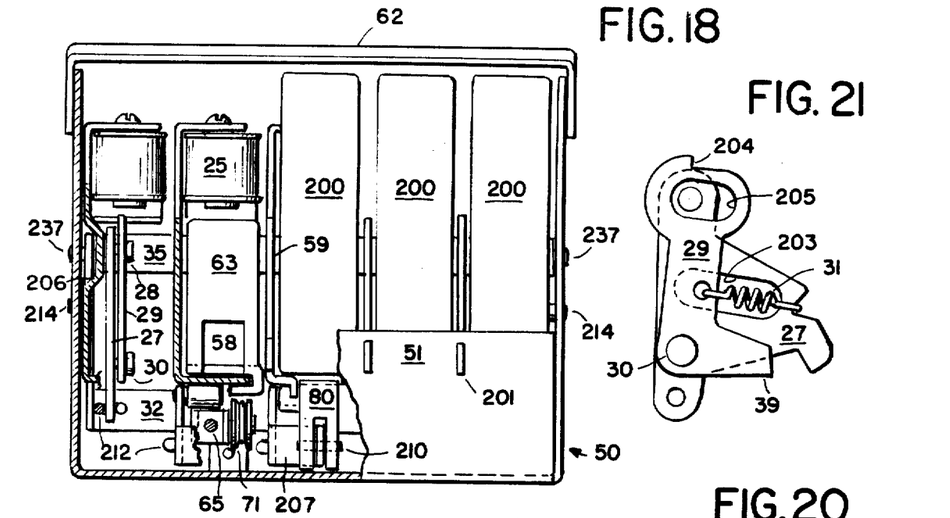
FIG. 18 is a partly fragmentary front view of a dispensing unit for narrow product shapes taken along the various section lines 18—18 of FIG. 19.
FIG. 21 is illustrating two coupling members of the latchable control mechanism.

A storing compactness is obtained in dispensers for narrow products like Gum and Mint packages if they are placed upright on a horizontal platform similarly to cigarette packages as illustrated in FIG. 9. Though the dispensing method could be same for this product group, the coupling mechanism with coupling stations next to each other will not fit to the available space which can be less than one inch in width for gum packages, for instance. Therefore a superimposed arrangement for coupling stations on the rear of product columns as shown in FIG. 18 is used utilizing the same basic coupling principle as previously described, though the drive bar 32 and start bar 35 have a different shape.

In FIG. 19 the packpusher 63 works same way as was described in full detail for FIG. 9 and therefore same reference numerals sre used for the identical parts. Platform 58 is guiding again the pusher 63 which is biased to the left by the spring 73 which exerts its force by means of slide 70, roller 71 and cable 74 to products 200, the first one of them being held against the lip 51 of base 50.

The partition plate 59 has locating tabs 201 extending through rectangular openings in lip 51 while the rear bentdown end of platform 58 is secured to a lanched tab of base 50 by means of a screw 202. Partition 59 is also used to mount the actuator and coupler pair 29 and 27 which is shown in full detail in FIG. 21 where the tension spring 31 is working in a clearance opening 203 and gives a clockwise bias to coupler 29 which is normally held in an inactive position by a latching corner 204 against armature 26 as shown in FIG. 19. The shoulder rivet 28, whose head is cleared by a slot 205 of coupler 29, is providing a limit stop for coupler 29. It is used to secure the actuator 27 pivotally to an embossed section 206 of partition 59.

A bellcrank 207 has a pivotstud 208 working freely in a pivot hole provided by a U-shaped sheetmetal piece 209 which is welded to platform 58 and which also supports the front end of guiderod 65. The lifter block 80 is pivotally secured by a pin 210 to a Z-shaped arm of bellcrank 207 which has a pivoting connection at 211 to a wireform-type connecting link 212 whose other end is pivotally secured to actuator 27 at 213. Thus a small pivoting motion of actuator 27 in a clockwise direction will cause a vertical motion to the lifter block 80 above the edge of lip 51 as shown in phantom lines and then same dispensing action will follow as previously described for cigarette packages. Barrier strip 62 could be used again as a safety retainer for the second-from-front merchandise item 200 through the system can work without it. The complete dispensing mechanism thus far described is mounted to the L-shaped partition 59 and could be viewed as an easily interchangeable dispenser module.

The power drive and cycle control is again same as previously described using motor 20 and switch 24 which are mounted to one of the side walls of base 50 while cam 22 with connecting link 94 are again supplying the reciprocating power to the drive bar 32. The latter works as a U-shaped pivoting member where the edge 34 will serve same function as the pins in previous versions. The pivotpins 237 of bar 32 on both sides of base member 50 are selected to be in line with pivotstuds 28 of actuators 27.

The startbar 35 is also a U-shaped pivoting bar similar to drive bar 32 with pivotstuds 214 on both sideplates of base 50. Bars 32 and 35 have again a motion parallel to each other, bar 32 being in contact with all the actuators 27 and keeping them in their extreme right position and bar 35 being in contact with the curved portion of all the couplers 29. If now one of the electrcal actuators 25 is energized by its switch 37, the armature 26 will trigger the unlatching action and the spring 31 of the coupler 29 will swing the start bar 35 in a clockwise direction causing the arm 36 to operate switch 24 which will interrupt the power to actuator 25 and start the rotation of cam 22 in a clockwise direction. The engagement of coupler arm 39 to bar 32 thus will transmit the motion of cam 22 to lifter block 80 and cause a dispensing action in the selected merchandise column. Before the end of the cam rotation its pin 40 will contact an arm 41 of bar 35 and move it in a counterclockwise direction which in turn will move the coupler 29 also in a counterclockwise direction until armature 26 can drop and retain coupler 29 in its standby position. Pin 40 will stop again in the position to clear arm 41 permitting the next selection of any coupler 29.

The latching action of coupler 29 as just described could be replaced again by the method shown in FIG. 15 or 17 which means that the two positions of coupler 29 will be controlled by an electromagnet or solenoid for pushing it to the active position against a holding friction, a two-position detent hold or an overcenter spring action of FIG. 17 while the resetting will be done again by the bar 35.

The basic framework and drive just described is applicable to operate numerous other dispensers requiring a selectable reciprocating power motion. One example of this kind is a dispenser for cylindrical containers which can be also as thin as gum packages. In FIG. 25 a modified two-pivot escapement principle is shown which was first claimed in my U.S. Pat. No. 3,991,907 in few different versions. It is shown again as a dispenser module which can be inserted and connected to the basic drive and framework of FIG. 19. This means that the actuator 27 is again pivotally secured to plate 59 by a shoulder rivet 28 and the coupler 29 with its spring 31 and electromagnet 25 work same way as previously described.

As shown in FIGS. 25 and 26, the platform 231 is a Z-shaped sheetmetal part fastened to partition plate 59 and the barrier 215 is bent over from the stock of wall 59. A four-bar linkage controlled dispenser mechanism in FIG. 25 provides motions to a U-shaped dispensing member 216 whose legs 217 and 218 can extend through openings 219 and 220 in platform 231. The dispensing member 216 acts as a connecting link in the four-bar linkage where cranks 221 and 222 are similarly pivotally mounted to posts 223 and 224 which are mounted to base plate 59. The front end or leg 217 of dispensing member 216 is bifurcated to receive and provide a pivoting connection to the L-shaped crank 221 at 244 and the center portion of dispensing member 216 is slotted to receive the end of the other crank 222. The pivotpin 225 for this joint is a bent over portion of link 212 which ties the dispenser mechanism to actuator 27 conveniently. As seen in FIG. 25, the foremost container 151 is positively held by barrier 215 and by the leg 217 because the centers 223 and 244 of crank 221 and the center of container 151 are in line or center 244 could be even selected to be slightly above this line.

If now the dispensing module is connected to the drive unit similar to FIG. 19 and electromagnet 25 is energized by its selection switch 37, actuator 27 will be given the reciprocating motion as previously described. Now the motion of point 213 of connecting link 212 to the right will move the dispenser member 216 to its other extreme position as shown in phantom lines. The location of pivot point 224, which is almost in line with points 244 and 225 in the standby position, will cause the leg 218 to raise considerably faster than the leg 217 will lower. This means that in their midposition they are both extending at least 75% through the openings 219 an 220 of platform 231 which gives the effect of a two-pivot escapement principle as illustrated in my previous U.S. Pat. No. 3,991,907 which guarantees a positive one-by-one dispensing to containers even if the guiding platform 231 and barrier 215 are in a fully vertical position.

When the front leg 217 is lowered to the level of platform 231, the foremost container 151 can roll down to a delivery location while the next one will be positively held by the leg 218. During return stroke of actuator 27 leg 218 will be lowered again but leg 217 will reach sooner to its retaining position and then the next container 151 can roll to the dispensing position ready for the next dispensing action.

There is a similarity of this escapement method and the one in FIG. 15. They both provide same kind of dispensing action but the one in FIG. 25 has more design flexibility. It can handle very narrow product containers or the dispensing member 216 could be made as wide as required by a long cylindrical product shape.

SUMMARY

The foregoing description and illustrations have demonstrated the flexibility and comparative simplicity of the control system which enables relatively compact storage arrangements for a number of different product shapes and storing arrangements which are utilizing in most cases the convenient horizontal storing platform or drawer type arrangement with the widely used "over the front end dispensing".

In the dispensing mechanisms of this invention the key member was the reciprocating actuator 27 which provides a flexibility to act as a dispenser actuator in numerous different ways. In FIG. 8, mounted next to each other to plate 59, it was providing the required operating motion to pivotrod 83, in FIG. 11 it was acting as a sectorgear for a one-revolution drive and in FIG. 15 it was directly a part of the dispensing member 153. In a superimposed arrangement a preferred application was a modular design with the actuators 27 on the rear of a storage unit. In FIG. 19 the lower end of the actuator 27 was providing a connection to link 212 while in FIG. 25 the upper end of it was used for the same purpose.

It is obvious now that the selectably coupled reciprocating motion of actuator 27 could be used for numerous other applications where the dispenser actuation and restricted operation in coin controlled systems is just one of the most common and demanding applications. In vending industry a large variety of dispensers are in use where a controlled reciprocating motion is used to actuate dispensing means using vertical storage columns or indexable wheels or carrier belt systems. They all could be operable by the relatively compact and simple drive system of this invention.

As an example, FIGS. 27 and 28 are providing another illustration of a dispensing method for rectangular or cubular shapes 230 stored on an inclined plane 231 similarly to FIG. 25. The dispensing of these shapes is relatively simple because there is no tendency of overriding the dispensing member as is the case for cylindrical containers. The arrangement includes a one-pivot dispensing member or escapement lever 232 pivotally mounted to a stud 233 which is secured to plate 59. Member 232 could be molded from a plastic material with a retaining leg 234 and with a pivot hole 235 for pivotally securing it to link 212. The dispensing member 232 works in a clearance opening 236 in platform 231 and in its standby position it permits the sliding of items 230 until they are stopped by leg 234. If now connecting link 212 is moved to the rear like in FIG. 25, dispensing member 232 will pivot in a counterclockwise direction to a position shown in phantom lines. This will lower the retaining leg 234 and raise the rear end 238 to a position to block the next merchandise item 230 when the first one is allowed to slide down. The return stroke of link 212 will cause the rear end 238 to move below the level of platform 231 and permit the downward sliding for the next item 230 until it is stopped by leg 234. This arrangement thus is employing the common one-pivot escapement principle operable by the actuator 27 in a selectable manner.

The various illustrated forms of this invention are thus showing the most common and typical applications for the basic selectable coupling principle which demonstrates its flexibility of applying it to suit considerably different conditions. Further combinations are possible and apparent to those skilled in the art and limited only by the imagination of a designer and therefore the intention is to limit the scope of this invention only by the following claims:

I claim:

1. An electrically selectable multistation coupling mechanism comprising a control cam, an electric motor for rotating said control cam, more than one coupling station each having an electrical actuator, a pivoting member and a coupler pivotally secured to said pivoting member; said control cam controlling electrical switching means for energizing and deenergizing said electric motor, said control cam having means to reciprocate a driving member reaching all of said coupling stations and being in contact with said pivoting members, said couplers having a non-active and active position responsive to the excitation of said electrical actuator, all of said couplers being in contact with a starting member, an excitation of said electrical actuator causing a motion to said coupler, said motion providing an engagement between said coupler and said driving means, said motion causing a switchover to said electrical switching means for starting said electric motor; said driving means reciprocating said pivoting member together with said engaged coupler, said coupler being resettable to said inactive position during the return half of said reciprocating motion when said driving means is driving said pivoting member back to its initial position.

2. The selectable coupling mechanism of claim 1 wherein all of said electrical actuators are connected to a power source through said electrical switching means of said electric motor and said starting of said electric motor acting to deenergize all of said electrical actuators simultaneously.

3. The selectable coupling mechanism of claim 2 wherein all of said electrical actuators having a selection switch for singly or selectively providing energization to said electrical actuators for moving said couplers to said active position and starting said electric motor.

4. The selectable coupling mechanism or claim 2 wherein each of said electrical actuators having a two-pole selection switch in a series connection with each other and with said motor switching means, said series connection preventing the excitation of more than one of said electrical actuators at a time.

5. The selectable coupling mechanism of claim 4 wherein the energization of said electrical actuators is further restricted by a coin validating and credit switching means making the energization of said electrical actuators possible only when said credit switching means is closing a circuit for said electrical actuator.

6. The selectable coupling mechanism of claim 5 wherein said credit switching means has more than one switching position each referring to a different credit value while said electrical actuators being grouped and selectively connected to said different credit switching positions making the energization of one of said electrical actuators possible only if its assigned price value is matched or exceeded by the credit value of said switching position which corresponds to the total value of inserted coins.

7. The selectable coupling mechanism of claim 2 wherein said coupling stations have a grouped arrangement where each group contains more than one of said electric actuators and one of said electric motors with said control cam and switching means; all of said selector switching means in all of said groups and all of said motor switching means having a series electrical connection whereby said series connection prevents the actuation of more than one of said electrical actuators at a time.

8. The selectable coupling mechanism of claim 1 wherein said non-active and active position of said coupler being controlled by a latching action unlatchable by the energization of said electrical actuator and resettable by said starting member powered by said control cam before the end of a single rotation of said cam.

9. The selectable coupling mechanism of claim 8 wherein said electrical actuator being an electromagnet and said latching action is taking place between the armature of said electromagnet and an arm of said coupler.

10. The selectable coupling mechanism of claim 8 wherein said electrical actuator being a solenoid and the energization of said solenoid causes an unlatching action to said coupler for moving it to said active position while said starting member is functioning to reset said coupler to said non-active position.

11. The selectable coupling mechanism of claim 1 wherein said non-active and active positions of said couplers have yieldable position retaining means, a motion to said active position being provided by said electrical actuator and a motion to said non-active position being provided during the return stroke of said reciprocating motion by said control cam.

12. The selectable coupling mechanism of claim 11 wherein said position retaining means being a spring loaded frictional hold.

13. The selectable coupling mechanism of claim 11 wherein said position reataining means being a two-position detent action.

14. The selectable coupling mechanism of claim 11 wherein said position retaining being provided by a bi-stable spring action.

15. The selectable coupling mechanism of claim 1 wherein said pivoting member operates the dispensing means for separating articles from a storage column.

16. The selectable coupling mechanism of claim 1 wherein said electric motor and more than one of said coupling stations being mounted to a base plate next to each other and said driving member being a reciprocating bar with drive points in a one-way contact with all of said pivoting members and engageable to said couplers when said couplers are moved to said active position, all of said couplers having a control arm in contact with said start bar, said contact being close to the pivot point of said pivoting member allowing a pivoting motion to said pivoting member and to said coupler without affecting the relative position of them.

17. The selectable actuating mechanism of claim 16 wherein said reciprocating bar being the connecting link of a parallelogram-type of four-bar linkage having cranks mounted to said base plate in line with the pivot points of said pivoting members, said four-bar linkage being reciprocated by said control cam on the opposite side of said pivoting members whereby said drive points being pins reaching through openings in said base plate to provide said coupling contact with said pivoting members and said couplers.

18. The selectable actuating mechanism of claim 16 wherein said pivoting members being linked to operate dispensing means for separating articles from a storage column, said storage column being supported by a horizontal platform having a front and rear end and a spring biased pusher for forcing said articles against said barrier, said dispensing means including a reciprocating lifting means with a working range from below said platform level to above the top line of said barrier, a coaction of said pusher and a full reciprocation of said lifting means permitting a release of one of said articles next to said barrier every time said pivoting member is reciprocated.

19. The selectable actuating mechanism of claim 18 wherein said pusher being slidably mounted to said platform and said spring bias being provided by a compression spring exerting its force to said pusher by means of a slidably mounted cable and roller arrangement wherein said pusher moves twice the distance of said spring and roller.

20. The selectable actuating mechanism of claim 19 wherein said pusher has a U-shaped section slidably embracing an edge of said platform, said pusher having a shoulder latchable against a tab on the rear end of said platform when said pusher is moved to the rear of said platform for storing the energy of said compression spring and simultaneously providing a turning moment to said pusher necessary for said latching.

21. The selectable actuating mechanism of claim 18 wherein said lifting means being a vertically moving block operable by a connecting lever reaching from said rear end to said front end underneath said platform to transmit the motion of said pivoting member to a vertical reciprocating motion of said block for the purpose of performing said dispensing action.

22. The selectable actuating mechanism of claim 16 wherein said pivoting member being a sector gear in mesh with an indexing gear, said indexing gear having means to drive an indexable member in one direction while said indexable gear is reciprocated by said sector gear.

23. The selectable actuating mechanism of claim 22 wherein the reciprocation of said sector gear drives said indexing gear slightly more than one revolution while said indexable member and said indexing gear having a one-way ratcheting means between them resulting to a one-revolution rotation to said indexable member whenever said sector gear is reciprocated.

24. The selectable actuating mechanism of claim 23 wherein said indexable member being a gear in mesh with another gear for driving a helical dispenser feed coil in a dispenser tray having a front end dispensing whereby said sector gear and drive mechanism is placed on the rear of said tray.

25. The selectable actuating mechanism of claim 23 wherein said indexable member being a gear in mesh with a first gear for rotating a first helical feed coil in one direction and in mesh with an idler gear to drive a second gear for rotating a second helical feed coil in the opposite direction for the purpose of dispensing wider article shapes placed between said first and second feed coil.

26. The selectable actuating mechanism of claim 16 wherein said pivoting member acts directly as a dispensing member for rolling articles stored on an inclined platform, said dispensing member having a pivot centerline parallel to and underneath of said platform, said dispensing member having front and rear restrainers working through openings in said platform and spaced apart somewhat less than the diameter of said articles, said restrainers having an angular relationship for alternately blocking said rolling articles when said dispensing member is reciprocated; a full reciprocation of said dispensing member permitting a release of the lowermost one of said articles while positively preventing the rolldown of the remainder of said articles.

27. The selectable actuating mechanism of claim 26 wherein more than one of said dispensing members being pivotally mounted next to each other to a U-shaped base member, said dispensing members having a one-piece construction with a round centerportion pivotally mounted to mating slots in said base member and secured in place by a retainer strip and by said platform on top of said base member, said platform having partitions to separate the columns of said articles, said platform, if used with a larger inclination angle, having a barrier strip on top of the first two of said articles to positively prevent an overriding of said restrainers during the reciprocation of said dispensing member.

28. The selectable actuating mechanism of claim 26 wherein two of said dispensing members having a parallelogram-type of link connection linking both of said rear restrainers and both of said front restrainers to transmit the pivoting motion of one of said driven dispensing members to the other of said dispensing member for the purpose of providing a stable hold to said articles if they have a larger length to diameter ratio.

29. The selectable coupling mechanism of claim 1 wherein said coupling stations being in a superimposed arrangement whereby said drive bar being in contact with all of said actuating members and any of said selected couplers which is moving to said active position transmits the reciprocation of said drive bar to said pivoting member.

30. The selectable actuating mechanism of claim 29 wherein any of said couplers in said active position transmits its coupling motion to a common member which is operating said switching means for starting said electric motor.

31. The selectable actuating mechanism of claim 30 wherein each of said coupling stations being mounted to a modular base plate connectable to a main base member, each of said modular base plates providing a mounting for said electric actuator, said pivoting member and said coupler; said main base member providing a mounting for said electric motor with said control cam, said switching means, said operating bar and for said start bar.

32. The selectable actuating mechanism of claim 29 wherein said pivoting member being linked to operate dispensing means for separating articles from a storage column, said storage column being supported by a horizontal platform having a front and rear end and a spring biased pusher for forcing said articles against said barrier, said dispensing means including a reciprocating lifting means with a working range from below said platform level to above the top line of said barrier, a coaction of said pusher and a full reciprocation of said lifting means permitting a release of one of said articles next to said barrier every time said pivoting member is reciprocated.

33. The selectable actuating mechanism of claim 32 wherein said pivoting member being located on said rear end of said platform and said lifting means being a lifting block on said front end operated by a bellcrank which is connected to said pivoting member by means of a connecting link.

34. The selectable actuating mechanism of claim 29 wherein said pivoting member operates a a two-pivot escapement mechanism for releasing rolling articles from a gravity fed inclined plane storage platform, said two-pivot escapement mechanism being placed on the lowermost end of said inclined plane, the dispensing member of said two-pivot escapement mechanism working through openings in said inclined plane for releasing one of said rolling articles every time said pivoting member is given a full reciprocation.

35. The selectable actuating mechanism of claim 34 wherein said two-pivot escapement mechanism being controlled by a four-bar linkage arrangement with its cranks mounted to said base member and its connecting link being a U-shaped member with its two legs alternately extending through said openings in said inclined platform to provide hold for said rolling articles and a release of one of said articles every time said pivoting member has a full reciprocation.

36. The selectable coupling mechanism of claim 29 wherein said pivoting member operates an escapement lever-type of dispensing member for releasing rectangularly shaped articles from a gravity fed inclined plane storage column, said dispensing member being placed on the lowermost end of said inclined plane, said dispensing member working through openings in said inclined platform for releasing one of said sliding articles every time said pivoting member is given a full reciprocation.

* * * * *